UNITED STATES PATENT OFFICE.

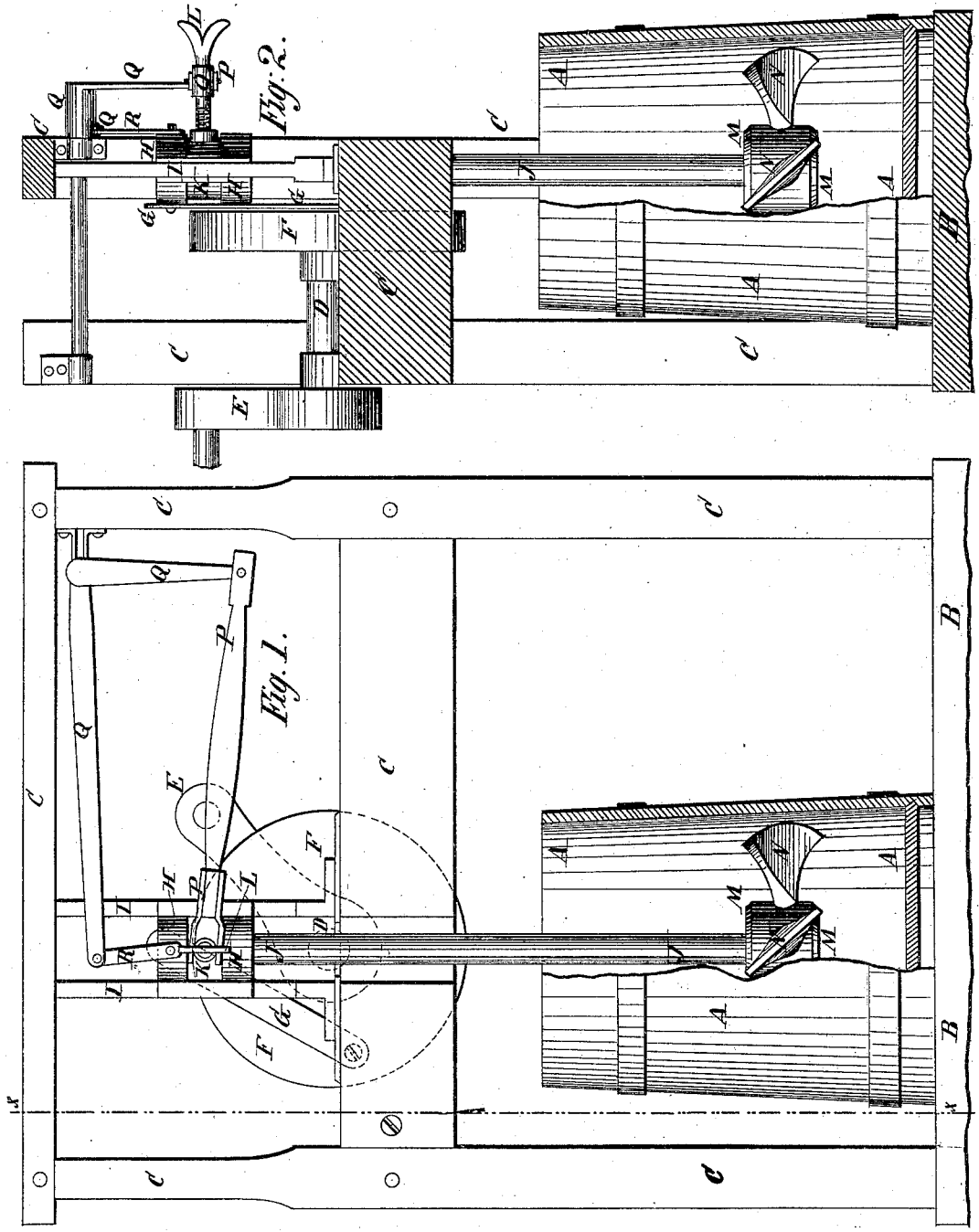

WILLIAM BRADBERRY, OF DARRTOWN, OHIO.

IMPROVEMENT IN RECIPROCATING CHURNS.

Specification forming part of Letters Patent No. 212,652, dated February 25, 1879; application filed August 23, 1878.

*To all whom it may concern:*

Be it known that I, WILLIAM BRADBERRY, of Darrtown, in the county of Butler, and State of Ohio, have invented a new and useful Improvement in Churning Apparatus, of which the following is a specification:

Figure 1 is a front view of my improved apparatus, part of the churn-body being broken away to show the dasher. Fig. 2 is a vertical cross-section of the same, taken through the line $x$ $x$, Fig. 1, part of the churn-body being broken away to show the dasher.

Similar letters of reference indicate corresponding parts.

The object of this invention is to furnish an improved churning apparatus which shall be so constructed that the resistance of the milk will be thrown back to the driving mechanism and assist in operating the churn, and which shall be simple in construction, convenient in use, and effective in operation, bringing the butter very quickly.

The invention consists in the combination of the socket, the hand-screw, the loose collar, the two connecting-rods, and the right-angled lever with the sliding socket-block, the driving mechanism, and the dasher-handle, provided with a screw-dasher, as hereinafter fully described.

A represents the churn-body, which stands upon the platform B. To the platform B is attached a frame, C, in bearings attached to which revolves a short horizontal shaft, D. To the rear end of the shaft D is attached the crank E, by means of which the churning is done. To the forward end of the shaft D is attached a crank-wheel or crank, F, to the crank-pin of which is pivoted the lower end of the connecting-rod G. The upper end of the connecting-rod G is pivoted to the socket-block H, the opposite sides of which are grooved to receive and slide upon the upright bars I. The ends of the bars I are attached to the frame C.

J is the dasher-handle, the upper end of which is inserted in the socket K, placed in the cavity of the sliding block H, where the said handle J is secured in place by a hand-screw, L, passing in through the side of the said socket K.

To the lower end of the dasher-handle J is attached a hub, M, which is provided with wings N, in the manner of a propeller-screw, so that the handle J may be partially rotated, first in one and then in the other direction, by the resistance of the milk against the wings of the dasher as the said dasher is moved up and down.

Upon the shank of the hand-screw L is placed a loose collar, O, to which is pivoted the forked inner end of the connecting-rod P.

The outer end of the connecting-rod P is pivoted to the end of the short arm of a right-angled lever, Q, which is pivoted at its angle to the frame C, or is attached to a shaft pivoted to the said frame.

To the end of the long arm of the lever Q is pivoted the upper end of a short connecting-rod, R, the lower end of which is pivoted to the upper part of the socket-block H.

By this construction the partial rotation of the dasher M N is transmitted by the device O P Q R to the sliding socket-block H, so that the force of said partial rotation will be utilized to assist in driving the mechanism by giving an up-and-down movement to the said dasher, and thus enable the churn to be much more easily operated.

Having thus described my invention, I claim as new and desire to secure by Letters Patent—

The combination of the socket K, the hand-screw L, the loose collar O, the connecting-rods P R, and the right-angled lever Q with the sliding socket-block H, the driving mechanism G F D E, and the dasher-handle J, provided with a screw-dasher, M N, substantially as herein shown and described.

WILLIAM BRADBERRY.

Witnesses:
JOHN P. JENNINGS,
GEORGE W. WHITEHILL.